Nov. 15, 1938.  F. H. WORKMAN  2,136,872
ANTISKID DEVICE
Filed April 29, 1938

Frank H. Workman
INVENTOR
BY Victor J. Evans & Co.
ATTORNEYS

Patented Nov. 15, 1938

2,136,872

UNITED STATES PATENT OFFICE 2,136,872

ANTISKID DEVICE

Frank H. Workman, Cleveland, Ohio

Application April 29, 1938, Serial No. 205,129

2 Claims. (Cl. 188—5)

My invention relates to anti-skid devices for motor vehicles and has for a primary object the provision of gripping wheels mounted adjacent the rear wheels of the motor vehicle together with means accessible to the driver of the vehicle for raising and lowering said gripping wheels.

Another object of my invention is to provide a device of the above described character which is simple in construction, efficient in operation, durable in use and economical in manufacture.

A further object of my invention is to provide a device of the above described character wherein the bearing brackets supporting the gripping wheels are so fashioned and arranged to effect a means for limiting the raising and lowering movements of the gripping wheels.

Other objects and advantages will be apparent from the following description, appended claims and annexed drawing.

Referring to the drawing wherein like reference characters designate like parts throughout the several views.

Figure 1:
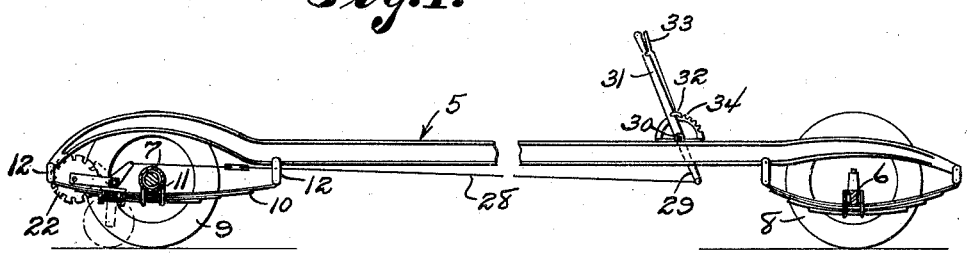
Figure 1 is a longitudinal sectional view of my invention illustrating the same in connection with the chassis of a motor vehicle.
Figure 2:
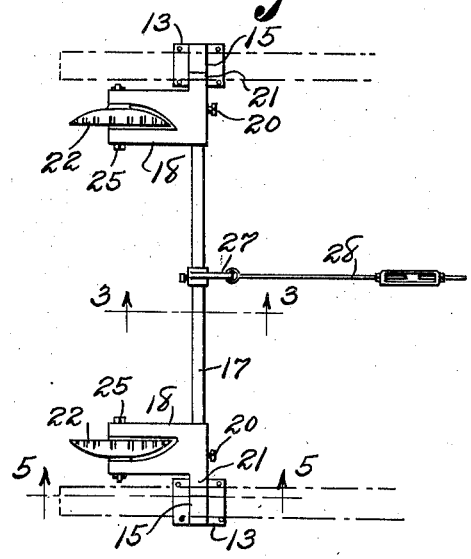
Figure 2 is a top plan view of my invention.
Figure 3:
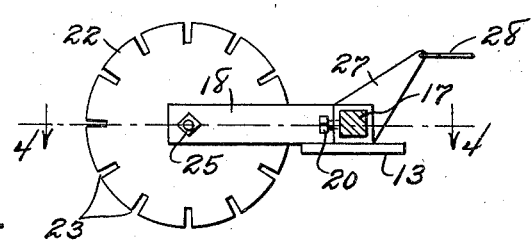
Figure 3 is a sectional view taken on the line 3—3 of Figure 2.

In practicing my invention I provide a motor vehicle chassis frame 5 equipped with the usual front and rear axles 6 and 7 respectively on which are mounted pairs of wheels 8 and 9. Supported on the rear axle 7 are springs 10 by means of U bolts 11. The ends of said springs are connected to the chassis frame by means of shackles 12.

Mounted on the upper faces of the springs 10 rearwardly of the axle 7 are bearing plates 13, the same being secured to said springs by means of U bolts 14. The bearing plates are fashioned with bearing sleeves 15 extending transversely of said plates and of a lesser length than said plates.

Journaled in the bearing sleeves 15 are circular shaped ends 16 of a square shaped operating shaft 17. Mounted on said shaft 17 are a pair of spaced gripping wheel housings 18, said housings formed with square shaped apertures 19 through which the shaft 17 passes and which serves to prevent relative rotation between the housings and shaft. Set screws 20 are provided in the housings for maintaining the housings in adjusted position on the shaft.

Figure 5:
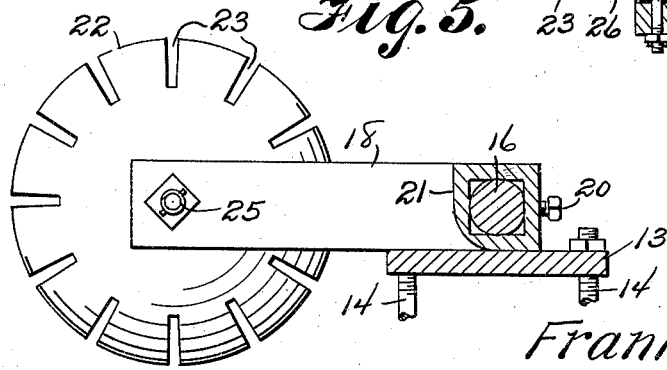
Figure 5 is a sectional view taken on the line 5—5 of Figure 2.

Each of the housings are provided with a laterally extending section 21 which extends over the bearing plates 13 in abutting relation with the sleeve sections 15 thereof. The laterally extending sections 21 of the housings are of a substantially square configuration in cross section, one of the corners thereof being of an arcuate shape to permit the housings to rotate from a horizontally extending position to a vertically extending position as clearly illustrated in Figure 5 thereby limiting the downward and upward movement of the housings.

Figure 4:
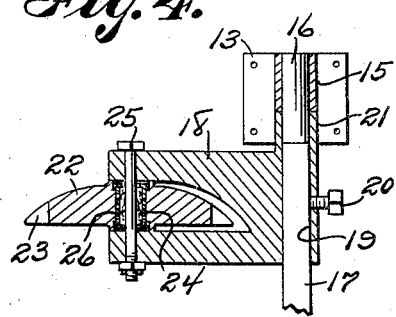
Figure 4 is a sectional view taken on the line 4—4 of Figure 3.

The outer ends of the housings are grooved and receive therein gripping wheels 22 having outer convex faces. The peripheries of said gripping wheels are fashioned with a plurality of notches 23 for effectively gripping a road surface when in lowered position, thereby preventing the motor vehicle from skidding on ice and the like. The gripping wheels 22 are mounted on a tubular perforated axle 24 in turn rotatably mounted on a bolt 25 extending through the housings 18. Said tubular axle is provided with a packing 26 saturated with a suitable lubricant whereby to lubricate the bearing surfaces of the axles and gripping wheels 22 as clearly illustrated in Figure 4.

Secured to the shaft 17 between the housings 18 is an operating arm 27, the outer end of which is connected to the rear end of an operating rod 28. The forward end of the rod 28 is connected to the lower end of a rocker arm 29 which is rigidly fastened to a rocker shaft 30 mounted in bearings on the upper face of the chassis frame.

A lever 31 provided with a pawl 32 and connected by means of a rod to a handle piece 33 is fixedly mounted on said rocker shaft, said pawl traveling on a rack sector 34 to adjust the position of the shaft 17 and gripping wheels 22.

In operation the device is actuated as follows. When it is desired to lower the gripping wheels so that the same will prevent the motor vehicle from skidding the lever 31 is manipulated to disengage the pawl 32 from the sector 34. This will cause the rod 28 to move rearwardly and effect rotation of the shaft 17 through the medium of the arm 27. Rotation of the shaft 17 serves to lower the housings 18 and thereby effect engagement of the gripping wheels 22 with the road surface. A reverse movement of the lever 31 serves to reverse the foregoing operation and position the gripping wheels above the road surface. During the lowering and raising operation, the sections 21 of the housings 18 coact with the plates 13 to limit the lowering or raising movement of the housings.

What I claim is:

1. A device of the character described, comprising, in combination with a motor vehicle chassis frame equipped with a pair of rear springs, bearing plates secured to said springs and fashioned with bearing sleeves, a shaft journaled in said sleeves, housings carried by said shaft and fashioned with extensions overlying said plates for limiting the movement of said housings relative to said plates, gripping wheels journaled in said housings and movable therewith, and an operating rod connected to said shaft for raising and lowering said gripping wheels.

2. A device of the character described, comprising, in combination with a motor vehicle chassis frame equipped with a pair of rear springs, bearing plates secured to said springs and fashioned with bearing sleeves, a shaft journaled in said sleeves, housings carried by said shaft and fashioned with extensions overlying said plates for limiting the movement of said housings relative to said plates, gripping wheels journaled in said housings and movable therewith, an operating rod connected to said shaft for raising and lowering said gripping wheels, and manually operable means connected to said rod for maintaining said housings in raised position relative to said plates.

FRANK H. WORKMAN.